US012704956B2

(12) United States Patent
Eliash et al.

(10) Patent No.: US 12,704,956 B2
(45) Date of Patent: Aug. 11, 2026

(54) UNDERFILL DETECTION FOR MEMORY SYSTEMS

(71) Applicant: Micron Technology, Inc., Boise, ID (US)

(72) Inventors: Tomer Eliash, Sunnyvale, CA (US); Sead Zildzic, Jr., Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 19/022,802

(22) Filed: Jan. 15, 2025

(65) Prior Publication Data

US 2025/0156071 A1 May 15, 2025

Related U.S. Application Data

(63) Continuation of application No. 18/221,141, filed on Jul. 12, 2023, now Pat. No. 12,242,722.

(60) Provisional application No. 63/389,620, filed on Jul. 15, 2022.

(51) Int. Cl.
*G06F 3/06* (2006.01)

(52) U.S. Cl.
CPC .......... *G06F 3/0604* (2013.01); *G06F 3/0619* (2013.01); *G06F 3/0653* (2013.01); *G06F 3/0679* (2013.01)

(58) Field of Classification Search
CPC .... G06F 3/0604; G06F 3/0619; G06F 3/0653; G06F 3/0679; G06F 3/0614; G06F 3/0638; G06F 3/0647; G06F 3/068
USPC .................................................. 711/154, 100
See application file for complete search history.

(56) References Cited

U.S. PATENT DOCUMENTS

2011/0185251 A1 7/2011 D'Abreu et al.
2015/0135023 A1* 5/2015 Mekhanik .......... G11C 16/0483 714/704
2020/0327934 A1* 10/2020 Jean ................... G11C 16/3459
2023/0214132 A1* 7/2023 Kim .................... G06F 12/0246 711/103
2024/0020002 A1 1/2024 Eliash et al.

* cited by examiner

*Primary Examiner* — Hosain T Alam
*Assistant Examiner* — Zubair Ahmed
(74) *Attorney, Agent, or Firm* — Schwegman Lundberg & Woessner, P.A.

(57) ABSTRACT

Aspects of the present disclosure configure a system component, such as a memory sub-system controller, to store data according to a second memory storage process instead of a first memory storage process based on an underfill threshold.

20 Claims, 6 Drawing Sheets

UNDERFILL DETECTION FOR MEMORY SYSTEMS

PRIORITY APPLICATION

This application is a continuation of U.S. application Ser. No. 18/221,141, filed Jul. 12, 2023, which claims the benefit of priority to U.S. Provisional Application Ser. No. 63/389,620, filed Jul. 15, 2022, all of which are incorporated herein by reference in their entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
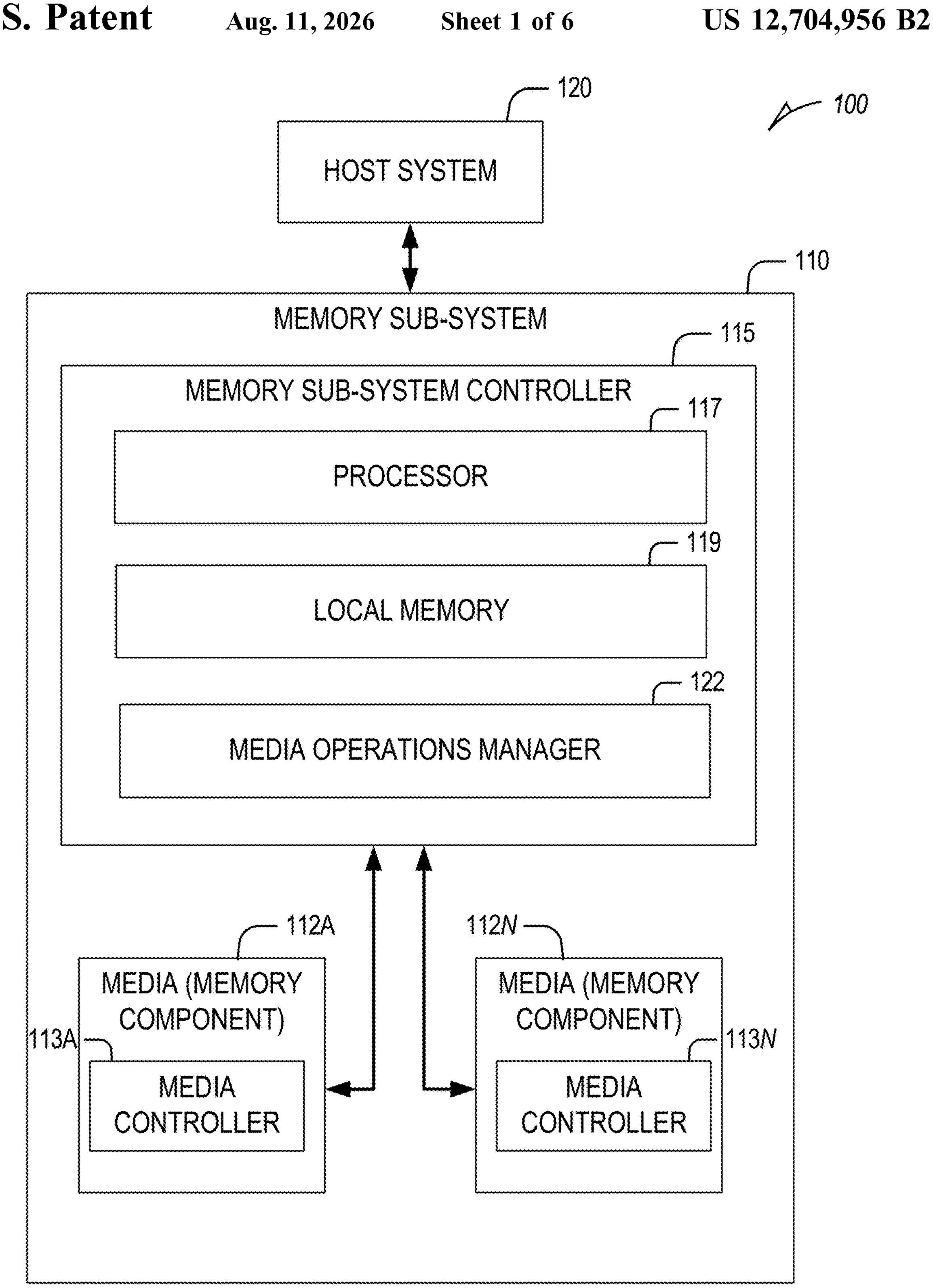
FIG. 1 is a block diagram illustrating an example computing environment including a memory sub-system, in accordance with some embodiments of the present disclosure.

Aspects of the present disclosure configure a system component, such as a memory sub-system controller, to convert or store data from being stored according to a first type of memory storage process (e.g., a single level cell memory storage) to a second type of memory storage process (e.g., multi-level cell memory storage) based on external factors, such as manufacturing and/or assembly processes. Particularly, the present disclosure can control the storage of data, such as firmware, from being stored according to a single level cell (SLC) memory storage process to a triple-level cell (TLC) or quad-level cell (QLC) memory storage process based on determining that underfill processes have been performed. This allows a manufacturer to perform various testing of a memory sub-system and expose the memory sub-system to high heat processes (e.g., soldering and gluing) without adversely affecting the underlying firmware. Also, the underlying firmware can be automatically transferred or converted from being stored according to the SLC memory storage process to the multi-level memory storage process upon detecting that such high heat processes have been completed to avoid having to perform such operations when the memory sub-system is operated by an end user or customer. This reduces the overall delay encountered by end users and customers in operating the memory sub-system which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Some memory devices include multiple types of memory storage elements or blocks which can store data according to different types of memory storage processes, such as SLC blocks storing data according to a first storage processes and QLC or TLC blocks storing data according to a second storage processes. SLC blocks are usually more reliable at storing data than QLC or TLC blocks. As such, the exported capacity of the memory devices is usually based on the storage capacity of the SLC blocks. Other memory instructions (e.g., the firmware) needed to manage operations of the memory subsystem are usually stored according to the QLC or TLC blocks storage process after the memory sub-system is delivered to a customer. Prior to delivering the memory sub-system to a customer or user for operation, during device manufacture, the firmware is usually installed or stored on the SLC blocks of the memory sub-system and, at some later point, when operated by the customer, the information is stored according to another storage process, such as the QLC or TLC storage process in the same blocks or moved to QLC or TLC blocks. This is to avoid damaging the firmware when various manufacturing operations and processes are performed. Namely, in the manufacturing process of the memory sub-system, the physical device that includes the memory sub-system is soldered onto a printed circuit board. Thereafter, a glue is applied under and/or over the soldered physical device to reduce physical stress (or mechanical weight) associated with the physical device. The application of the soldering and the glue (also referred to as the underfilling or underfill) causes exposure of very high heat to the memory sub-system. The underfill operations can expose the memory sub-system to lower temperature heat than the soldering operations. Such high heat can damage or introduce errors in data stored in the QLC or TLC blocks but not in the SLC blocks.

Typical systems avoid having the firmware become corrupt during the manufacturing process by preventing or blocking folding operations in which the firmware is stored according to the QLC or TLC storage process until the memory sub-system is put to use by a user or customer. Namely, the firmware usually remains stored according to the SLC storage process until a logical saturation point is reached. The logical saturation point is determined by the amount of information stored on the SLC blocks. Once the amount of information reaches a threshold level, the memory controller transfers the firmware from being stored according to the SLC storage process to the QLC or TLC storage processes to free up storage for use by the customer or user. The transfer of the firmware from the SLC storage processes to the QLC or TLC storage processes can take a great deal of time and can introduce substantial delays and inefficiencies. This makes such systems less desirable and inefficient to operate.

Aspects of the present disclosure address the above and other deficiencies by providing a memory controller that can store certain data (e.g., firmware) according to one type of storage process (e.g., SLC storage) to another type of storage processes (e.g., QLC or TLC storage) during the manufacturing process and prior to delivering the memory sub-system to an end user or customer. Specifically, the present disclosure can detect when an underfill operation has been performed (which can be indicative of completion of the manufacturing process) and, in response, can transfer the data from being stored according to the SLC storage process to the QLC or TLC storage process either in the same blocks or different set of blocks or memory components. This avoids having to perform such a transfer when the memory sub-system is being operated by the end user or customer and reduces delays and inefficiencies presented to the customer or end user.

For example, the memory controller can store a set of data (e.g., firmware) in the first set of memory components according to a first storage process (e.g., SLC memory). The memory controller can store a pattern of data in the second set of memory components according to a second storage process (e.g., QLC or TLC memory). The memory controller can compute a data retention parameter for the pattern of data, such as after a power cycle operation has been detected, and can determine whether the data retention parameter corresponds to an underfill threshold. The underfill threshold can represent an expected level or quantity of errors that result from application of heat associated with underfill and/or soldering operations to the memory sub-system. The memory controller can, in response to determining that the data retention parameter corresponds to the underfill threshold, transfer the set of data from being stored according to the first storage process to the second storage process in the same set of memory components or different set of memory components. This increases the efficiency of operating memory systems by the end user or customer.

In some examples, the memory controller stores the pattern of data in a last state of the second set of memory components and reads the pattern of data in the last state of the second set of the memory components. The memory controller counts a quantity of zeros resulting from reading the pattern of data. The memory controller compares the quantity of zeros to the underfill threshold and determines that the data retention parameter corresponds to the underfill threshold in response to determining that the quantity transgresses the underfill threshold.

In some examples, the memory controller determines whether the data retention parameter corresponds to a soldering threshold. In response to determining that the data retention parameter corresponds to the soldering threshold, the memory controller refreshes the pattern of data in the second set of memory components. The memory controller determines whether the data retention parameter corresponds to a soldering threshold and, in response to determining that the data retention parameter fails to correspond to the soldering threshold, performs the determining of whether the data retention parameter corresponds to the underfill threshold.

In some examples, the memory controller, in response to determining that the data retention parameter fails to correspond to the underfill threshold, determines whether logical saturation of the memory sub-system has been reached. For example, the memory controller can determine whether an amount of data stored according to the SLC memory storage process (such as in the first set of memory components) exceeds a size threshold. In response to determining that the logical saturation of the memory sub-system has not been reached, the memory controller monitors for a power cycle event. The memory controller performs the computing the data retention parameter in response to detecting the power cycle event. In response to determining that the logical saturation of the memory sub-system has been reached, the memory controller allows folding operations to enable the set of data to be stored in the first set of memory components according to the SLC memory storage process.

In some examples, the memory controller prevents folding operations to prevent the set of data from being transferred from being stored according to the first storage process to the second storage process. Then, the memory controller stores the pattern of data after the folding operations are prevented. In some examples, the second set of memory components can store data according to the TLC memory storage process and, in such cases, the memory controller designates one or more blocks of the second set of memory components, in which the pattern of data is stored, with a special pattern of all seventh state to store the pattern of data. In some examples, the second set of memory components can store data according to the QLC memory storage process and, in such cases, the memory controller designates one or more blocks of the second set of memory components, in which the pattern of data is stored, with a special pattern of all fifteenth state to store the pattern of data.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first one of the memory components 112A to 112N can be implemented by a first memory die (or a first collection of memory dies) and a second one of the memory components 112A to 112N can be implemented by a second memory die (or a second collection of memory dies).

In some examples, the first one of the memory components 112A to 112N can be implemented to store data according to a first memory storage process (e.g., SLC memory type storage process) and the second one of the memory components 112A to 112N can be implemented to store data according to a second memory storage process (e.g., multi-level cell, TLC, and/or QLC memory type storage process). In some cases, a first portion of the first one of the memory components 112A to 112N can be implemented by the first memory type and a second portion of the first one of the memory components 112A to 112N can be implemented by the second memory type. In some examples, the same set of memory components 112A to 112N can store data according to multiple types of storage processes. Namely, the first one of the memory components 112A can store data according to a first storage process and can also store data according to the second storage process. In such cases, data can be folded or transferred to being stored from one storage process to another in the same set of memory components.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more of the memory sub-system 110. In some embodiments, the host system 120 is coupled to different types of memory sub-system 110. FIG. 1 illustrates one example of a host system 120 coupled to the memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells of different memory types, such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh. The memory sub-system controller 115 can communicate with the memory components 112A to 112N to perform folding operations, such as to transfer certain data (e.g., firmware) from one type of memory (e.g., SLC) to another type of memory (e.g., MLC, QLC, or TLC). These folding operations can be performed prior to operating the memory components 112A to 112N by an end user (e.g., before a logical saturation is reached) or can be performed after operating the memory components 112A to 112N by the end user (e.g., after the logical saturation is reached).

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor 117 (processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to manage the transfer of storage of certain data (e.g., firmware) from a first type memory storage process (e.g., an SLC memory type storage process implemented by the first one of the memory components 112A to 112N) to a second memory storage process (e.g., a QLC memory type implemented by the same first one of the memory components 112A to 112N or a second one of the memory components 112A to 112N). The media operations manager 122 can condition the transfer of the certain data on the data retention measure of a block of test data. Namely, the media operations manager 122 can compare the data retention measure or parameter of the block of test data to a first threshold (e.g., a soldering threshold) when a power cycle event is detected. If the data retention measure or parameter transgresses the first threshold, the media operations manager 122 can refresh the block of test data as the media operations manager 122 may determine that the memory sub-system 110 has been exposed to soldering operations by a manufacturer. If the data retention measure or parameter fails to transgress the first threshold, the media operations manager 122 can compare the data retention measure or parameter of the block of test data to a second threshold (e.g., an underfill threshold which may be smaller than the first threshold).

In some examples, if the data retention measure or parameter transgresses the second threshold, the media operations manager 122 can initiate transfer of the certain data from the first type of memory storage process to the second type of memory storage process as the media operations manager 122 may determine that the memory sub-system 110 has been exposed to underfill operations by a manufacturer. In some examples, to initiate the transfer, the media operations manager 122 can unblock or allow folding operations to take place. These operations can take place during manufacture or when the memory sub-system 110 is being used by a customer or client device or is in communication with the host system 120. By default, the media operations manager 122 can monitor whether the amount of information stored by the first type of memory storage process exceeds a size threshold (e.g., a logical saturation). In such cases, if the amount of information stored by the first type of memory exceeds the size threshold, the media operations manager 122 can unblock or allow folding operations to take place regardless of the first/second thresholds being transgressed by the data retention measure or parameter of the block of test.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
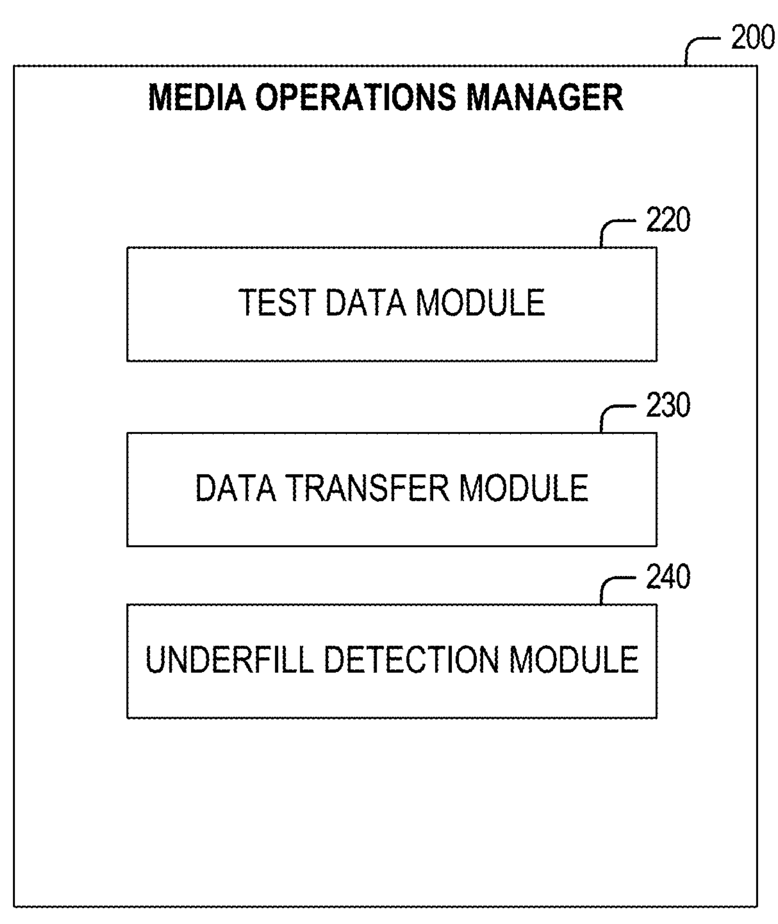
FIG. 2 is a block diagram of an example media operations manager, in accordance with some implementations of the present disclosure.

FIG. 2 is a block diagram of an example media operations manager 200, in accordance with some implementations of the present disclosure. As illustrated, the media operations manager 200 includes a test data module 220, a data transfer module 230, and an underfill detection module 240. For some embodiments, the media operations manager 200 can differ in components or arrangement (e.g., fewer or more components) from what is illustrated in FIG. 2.

Figure 3:
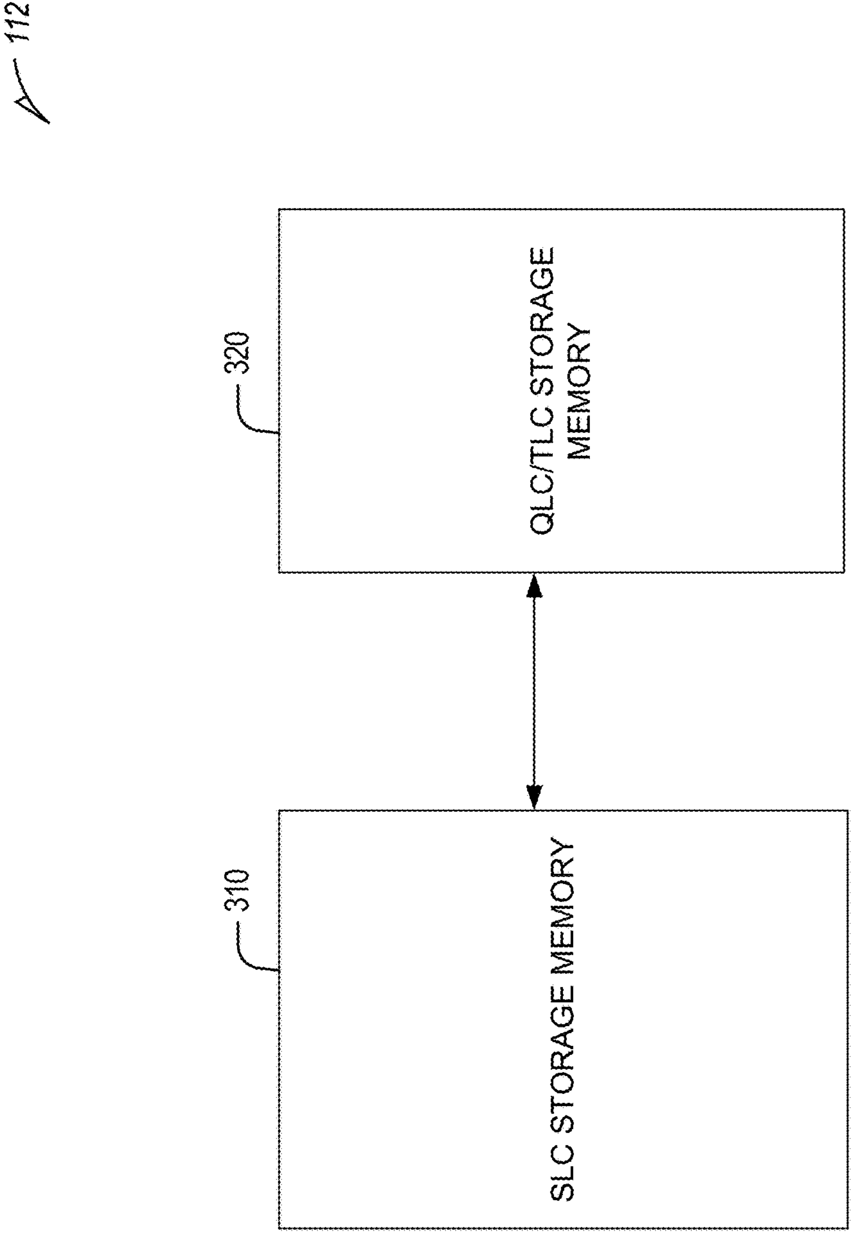
FIG. 3 is a block diagram of an example different memory storage processes, in accordance with some implementations of the present disclosure.

The media operations manager 200 can initially store a set of data (e.g., firmware) in a first type of memory (e.g., a memory component 112A). For example, as shown in FIG. 3, the media operations manager 200 can store firmware in SLC storage memory 310. The media operations manager 200 can also disable folding operations from being performed in relation to the set of data. This ensures that the set of data remains stored according to the SLC storage memory storage process 310 until one or more conditions are met. The conditions can include soldering operations being detected, underfill operations being detected, and/or a logical saturation of the memory sub-system 110 being reached.

The test data module 220 can store a test data block in a second type of memory storage process (e.g., the second one of the memory components 112A to 112N). The second type of memory storage process can be less resilient to high temperature than the first type of memory and is more sensitive and less reliable. The test data block can include an individual or unique pattern of data. For example, as shown in FIG. 3, the test data module 220 can store the pattern of data in the QLC/TLC storage memory storage process 320.

The pattern of data that is stored can be dependent on the type associated with the second type of memory storage process. Specifically, the test data module 220 stores a collection of all '0's in the highest state of the memory cells of the second type of the memory storage process. As an example, if the second set of memory components that include the second type of memory storage process correspond to a TLC memory type storage process, the test data module 220 designates one or more blocks of the second set of memory components, in which the pattern of data is stored, with a special pattern of all seventh state. As an example, if the second set of memory components that store data according to the second type of memory storage process correspond to a QLC memory type, the test data module 220 designates one or more blocks of the second set of memory components, in which the pattern of data is stored, with a special pattern of all fifteenth state.

The underfill detection module 240 is configured to monitor and detect for soldering and/or underfill operations being performed during a manufacturing process. To do so, the underfill detection module 240 monitors a power cycle state of the memory sub-system 110. In response to detecting that the memory sub-system 110 has been powered ON, the underfill detection module 240 can read the test block that includes the pattern of data from the memory cells of the second type of the memory storage process (e.g., from the QLC/TLC storage memory storage process 320). The underfill detection module 240 can compute a data retention parameter associated with the pattern of data. To do so, the underfill detection module 240 measures the last state of the memory cells of the second type of the memory storage process to count the quantity of '0's that are detected by application of a certain voltage to the second type of the memory. The underfill detection module 240 compares the data retention parameter, such as the quantity of '0's, to a first threshold, such as a soldering threshold. The underfill detection module 240 can determine that the data retention parameter exceeds or transgresses the first threshold. In such cases, the underfill detection module 240 can refresh the test block by pushing back the values of the test block to the original value, to have '0's stored in the last state of the memory cells of the second type of the memory storage process.

In some examples, underfill detection module 240 can continue to monitor for another power cycle event. Namely, the underfill detection module 240 can detect that a reset signal has been triggered or that the memory sub-system 110 has been powered ON after previously being power OFF. In some cases, the underfill detection module 240 can read the test block again that includes the pattern of data from the memory cells of the second type of the memory storage process (e.g., from the QLC/TLC storage memory storage process 320). The underfill detection module 240 can re-compute a data retention parameter associated with the pattern of data. To do so, the underfill detection module 240 measures the last state of the memory cells of the second type of the memory storage process to count the quantity of '0's that are detected by application of a certain voltage to the second type of the memory storage process. The underfill detection module 240 compares the data retention parameter, such as the quantity of '0's, to a first threshold, such as a soldering threshold. The underfill detection module 240 can determine that the data retention parameter fails to exceed or transgress the first threshold. In such cases, the underfill detection module 240 can compare the data retention parameter to a second threshold, such as an underfill threshold.

The underfill detection module 240 can determine that the data retention parameter exceeds or transgresses the second threshold. In such cases, the underfill detection module 240 can instruct the data transfer module 230 to enable folding operations to be performed, such as to allow or initiate transfer of the set of data (e.g., the firmware) from being stored according to the first type of memory storage process (e.g., SLC storage memory storage process 310) to the second type of memory storage process (e.g., the QLC/TLC storage memory storage process 320). The data transfer module 230 can transfer the set of data immediately or at some later point, such as when an end user operates the memory sub-system 110.

The underfill detection module 240 can determine that the data retention parameter fails to exceed or transgress the second threshold. In such cases, the underfill detection module 240 can access or determine how much data is currently stored in the first type of memory storage process. The underfill detection module 240 compares the amount of data to a size threshold (e.g., a logical saturation). In response to determining that the amount of data transgresses or exceeds the size threshold, the underfill detection module 240 can instruct the data transfer module 230 to enable folding operations to be performed, such as to allow or initiate transfer of the set of data (e.g., the firmware) from the first type of memory storage process (e.g., the first one of the memory components 112A to 112N or SLC storage memory 310) to the second type of memory storage process (e.g., the second one of the memory components 112A to 112N or QLC/TLC storage memory 320). The data transfer module 230 transfers the set of data immediately or at some later point, such as when an end user operates the memory sub-system 110.

Figure 4:
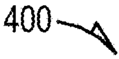
FIGS. 4 and 5 are flow diagrams of example methods to perform memory operations, in accordance with some implementations of the present disclosure.
Figure 4:
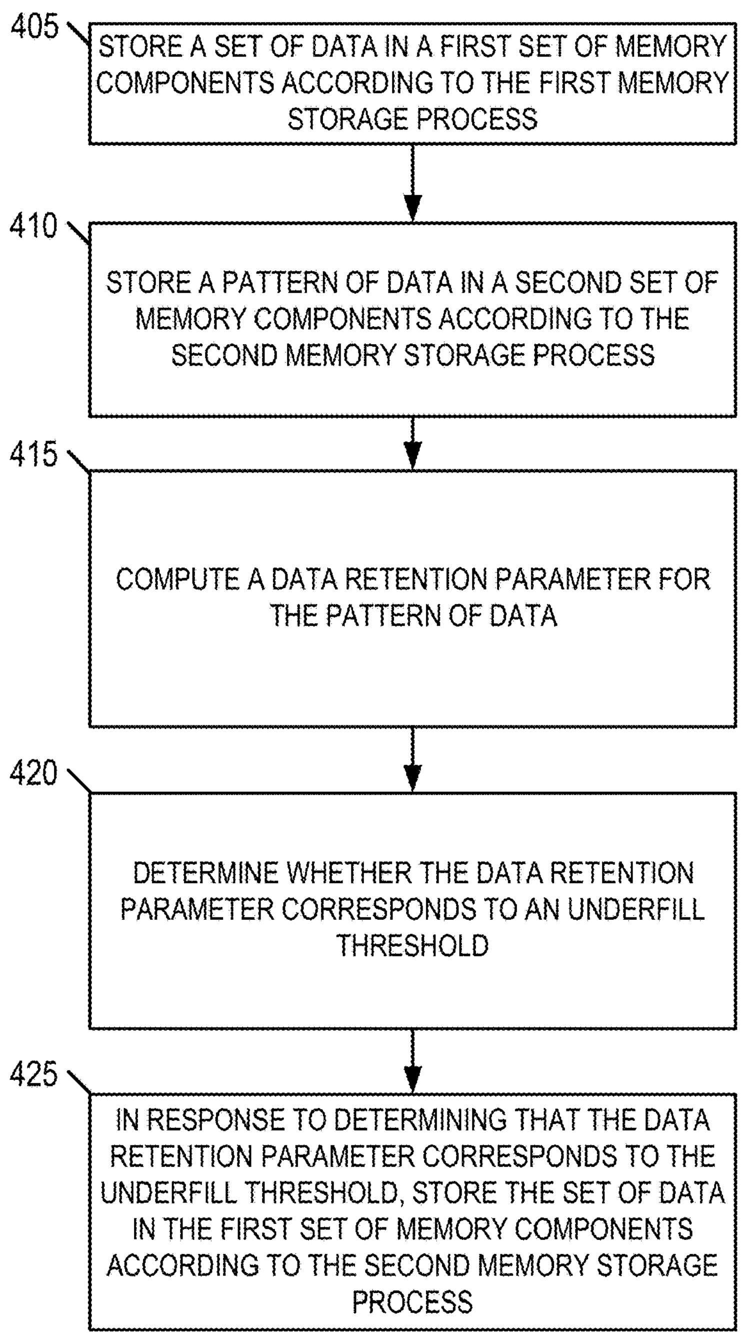

FIG. 4 is a flow diagram of an example method 400 to perform memory operations on a plurality of superblocks before an incomplete superblock, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to FIG. 4, a method (or process) 400 begins at operation 405, with a media operations manager 122 of a memory sub-system (e.g., memory sub-system 110) storing a set of data in a first set of memory components according to the first memory storage process. Then, at operation 410, the media operations manager 122 stores a pattern of data in a second set of memory components according to the second memory storage process. At operation 415, the media operations manager 122 computes a data retention parameter for the pattern of data and, at operation 420, the media operations manager 122 determines whether the data retention parameter corresponds to an underfill threshold. The media operations manager 122, at operation 425, in response to determining that the data retention parameter corresponds to the underfill threshold, stores the set of data in the first set of memory components according to the second memory storage process.

Figure 5:
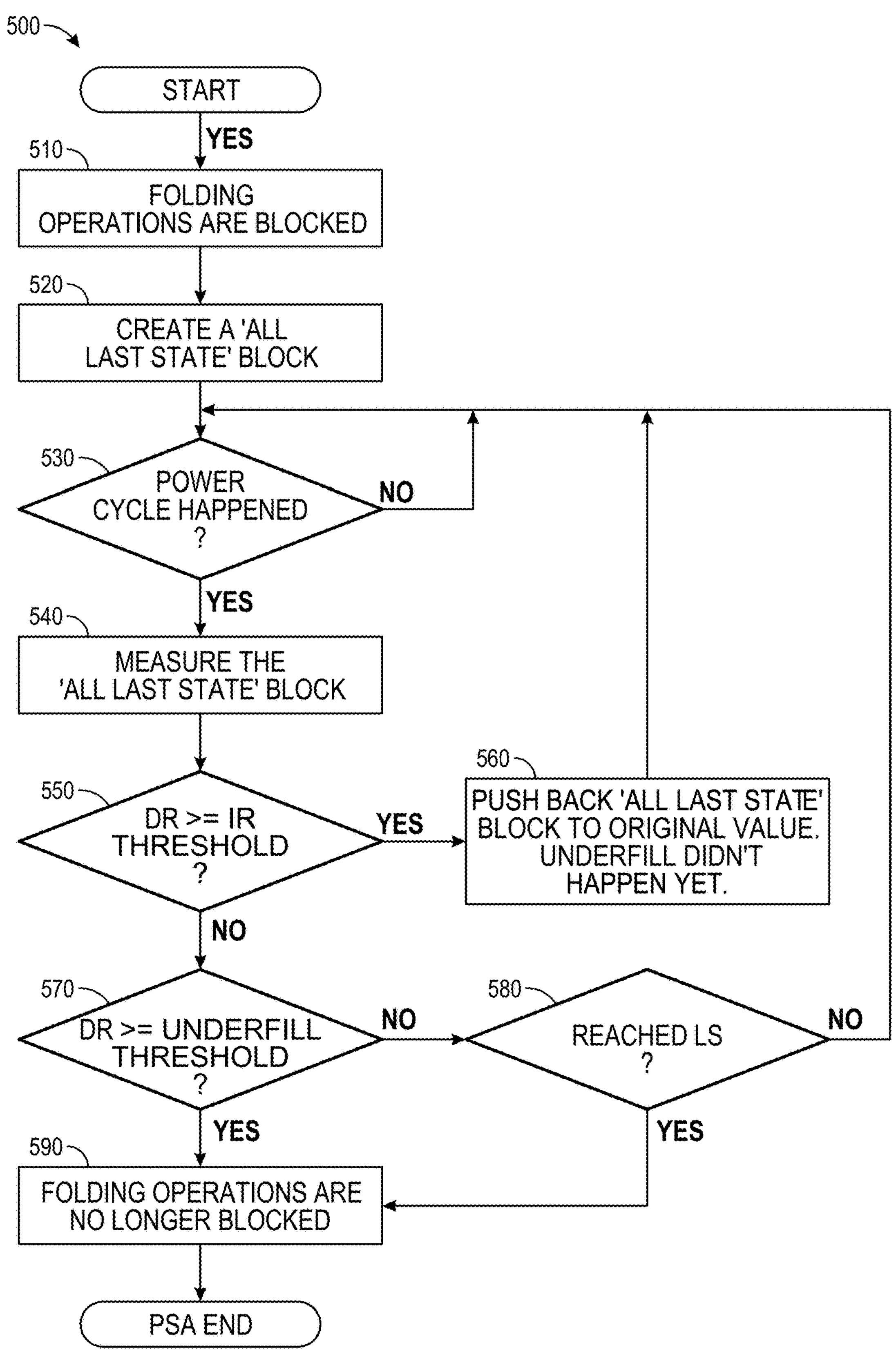

Referring now to FIG. 5, a method (or process) 500 begins at operation 510, with a media operations manager 122 of a memory sub-system (e.g., memory sub-system 110) blocking folding operations from being performed (e.g., to prevent firmware from being transferred from SLC memory to MLC/QLC/TLC memory). Then, at operation 520, the media operations manager 122 creates an "all last state" block to store a pattern of data. The "all last state block" stores a pattern of values, such as all '0's in the last state of the memory cells that implement the MLC/QLC/TLC memory. The media operations manager 122 monitors for a power cycle event at operation 530. Once the power cycle event has been detected at operation 530, the media operations manager 122 measures the "all last state" block at operation 540, such as by reading the quantity of '0's stored in the "all last state" block. The media operations manager 122 compares the "all last state" block (e.g., the quantity of '0's) to an IR threshold (e.g., a first threshold corresponding to soldering operations). At operation 550, the media operations manager 122 refreshes the "all last state" block to the original value at operation 560 and determines that an underfill operation has not yet been performed in response to determining that the IR threshold has been met.

At operation 570, in response to determining that the IR threshold is not met (e.g., the "all last state" block fails to transgress the IR threshold), the media operations manager 122 compares the "all last state" block to an underfill threshold. In response to determining that the "all last state" block transgresses the underfill threshold, the media operations manager 122 unblocks or allows folding operations to be performed at operation 590. In response to determining that the "all last state" block fails to transgress the underfill threshold, the media operations manager 122 determines whether a logical saturation has been reached at operation 580. The media operations manager 122 continues monitoring for the power cycle event at operation 530 and comparing the "all last state" block to the IR threshold and underfill threshold and determining whether the logical saturation is reached until one of these conditions (e.g., underfill threshold being met by the "all last state" block and/or the logical saturation being reached) is met, at which point the folding operations are allowed in operation 590.

In view of the disclosure above, various examples are set forth below. It should be noted that one or more features of an example, taken in isolation or combination, should be considered within the disclosure of this application.

Example 1: a system comprising: first and second sets of memory components of a memory sub-system, each of the first and second sets of memory components configured to store information according to a first memory storage process and a second memory storage process, the second set of memory components corresponding to a second memory storage type; and a processing device operatively coupled to the first and second sets of memory components, the processing device being configured to perform operations comprising: storing a set of data in the first set of memory components according to the first memory storage process; storing a pattern of data in the second set of memory components according to the second memory storage process; determining whether the data retention parameter corresponds to an underfill threshold; and in response to determining that the data retention parameter corresponds to the underfill threshold, storing the set of data in the first set of memory components according to the second memory storage process.

Example 2: the system of Example 1 wherein the first memory storage process comprises single level cell (SLC) memory storage, and wherein the second memory storage process comprises quad-level cell (QLC) or triple-level cell (TLC) memory storage.

Example 3: the system of Examples 1 or 2, wherein the operations comprise: storing the pattern of data in a last state of the second set of memory components; reading the pattern of data in the last state of the second set of the memory components; and counting a quantity of zeros resulting from reading the pattern of data.

Example 4: the system of Example 3, wherein the operations comprise: comparing the quantity of zeros to the underfill threshold; and determining that the data retention parameter corresponds to the underfill threshold in response to determining that the quantity transgresses the underfill threshold.

Example 5: the system of any one of Examples 1-4, wherein the operations comprise: determining whether the data retention parameter corresponds to a soldering threshold; and in response to determining that the data retention parameter corresponds to the soldering threshold, refreshing the pattern of data in the second set of memory components.

Example 6: the system of Example 5, wherein the operations comprise: determining whether the data retention parameter corresponds to a soldering threshold; and in response to determining that the data retention parameter fails to correspond to the soldering threshold, performing the determining whether the data retention parameter corresponds to the underfill threshold.

Example 7: the system of any one of Examples 1-6, wherein the operations comprise: in response to determining that the data retention parameter fails to correspond to the underfill threshold, determining whether logical saturation of the memory sub-system has been reached.

Example 8: the system of Example 7, wherein the operations comprise: in response to determining that the logical saturation of the memory sub-system has not been reached, monitoring for a power cycle event; and performing the computing the data retention parameter in response to detecting the power cycle event.

Example 9: the system of any one of Examples 7 or 8, wherein the operations comprise: in response to determining that the logical saturation of the memory sub-system has been reached, allowing folding operations to enable the set of data to be stored in the first set of memory components according to the second memory storage process.

Example 10: the system of any one of Examples 1-9, wherein the operations comprise preventing folding operations to prevent the set of data from being stored according to the second memory storage process, the pattern of data being stored after the folding operations are prevented.

Example 11: the system of any one of Examples 1-10, wherein the set of data comprises firmware of the memory sub-system.

Example 12: the system of any one of Examples 1-11, wherein the second memory storage process comprises TLC memory storage, and wherein the operations comprise: designating one or more blocks of the second set of memory components, in which the pattern of data is stored, with a special pattern of all seventh state.

Example 13: the system of any one of Examples 1-12, wherein the second memory storage process comprises QLC memory storage, and wherein the operations comprise: designating one or more blocks of the second set of memory components, in which the pattern of data is stored, with a special pattern of all fifteenth state.

Methods and computer-readable storage medium with instructions for performing any one of the above Examples.

Figure 6:
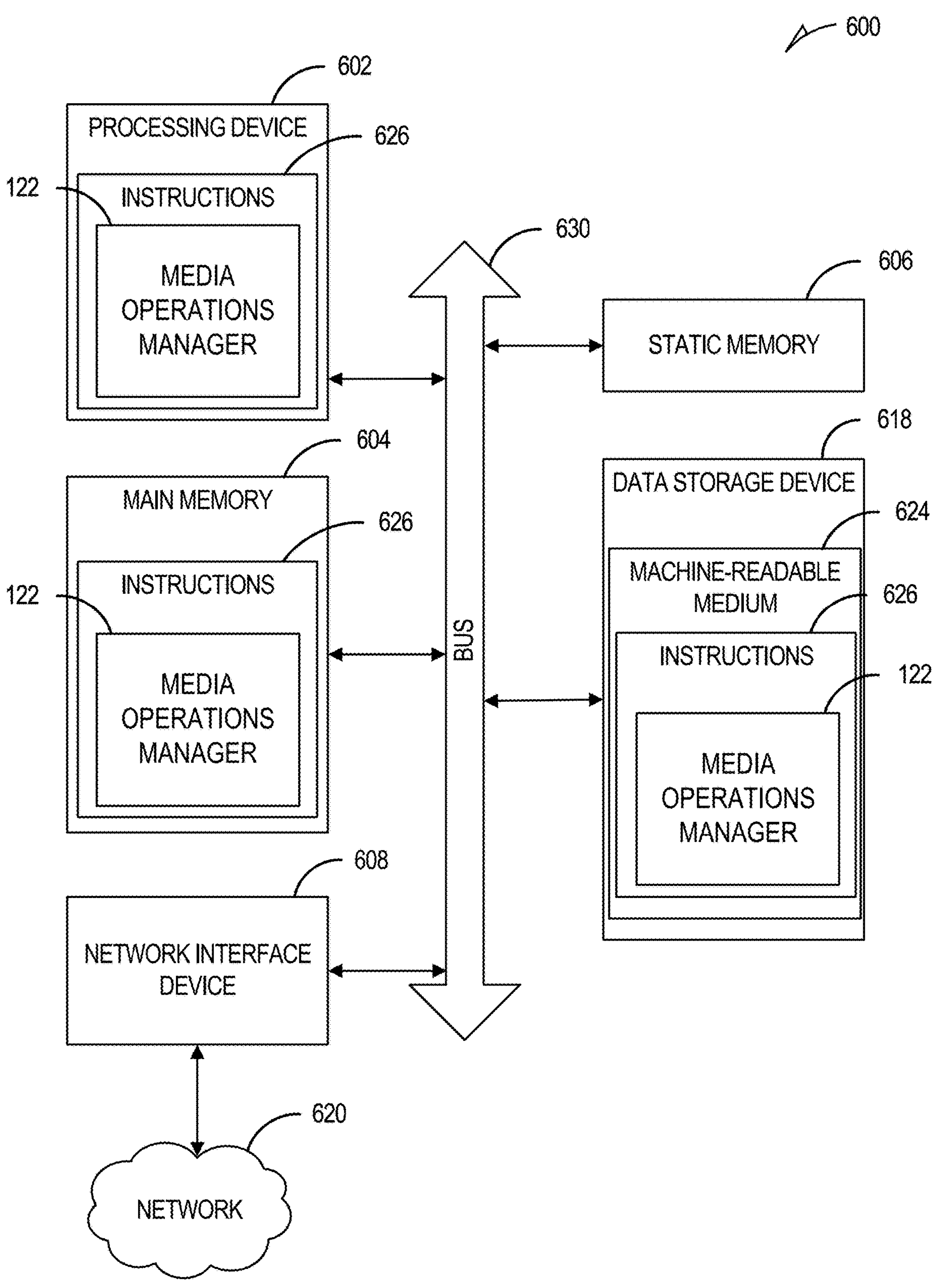
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); crasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:

a set of memory components of a memory sub-system configured to store information according to a first memory storage process and a second memory storage process; and a processing device operatively coupled to the set of memory components, the processing device being configured to perform operations comprising:

storing a set of data in a first portion of the set of memory components according to the first memory storage process;

determining whether a data retention parameter of additional data stored in a second portion of the set of memory components corresponds to a first physical manufacturing process or a second physical manufacturing process; and performing an operation in association with at least one of the additional data or the set of data in response to refreshing the additional data stored in the second portion of the set of memory components and in response to determining whether the data retention parameter of additional data stored in the second portion of the set of memory components corresponds to the first physical manufacturing process or the second physical manufacturing process.

2. The system of claim 1, the operations comprising:

storing, as the additional data, a pattern of data in the second portion of the set of memory components according to the second memory storage process; and refreshing the pattern of data in response to determining that the data retention parameter corresponds to the first physical manufacturing process.

3. The system of claim 1, wherein the first memory storage process comprises single level cell (SLC) memory storage, and wherein the second memory storage process comprises quad-level cell (QLC) or triple-level cell (TLC) memory storage.

4. The system of claim 1, wherein the operations comprise:

storing the additional data in a last state of the second portion of the set of memory components;

reading the additional data in the last state of the second portion of the set of memory components; and counting a quantity of zeros resulting from reading the additional data.

5. The system of claim 4, wherein the operations comprise:

comparing the quantity of zeros to an underfill threshold; and determining that the data retention parameter corresponds to the underfill threshold in response to determining that the quantity transgresses the underfill threshold.

6. The system of claim 1, wherein the operations comprise:

determining whether the data retention parameter corresponds to a soldering threshold; and in response to determining that the data retention parameter corresponds to the soldering threshold, refreshing the additional data in the second portion of the set of memory components.

7. The system of claim 1, wherein the operations comprise:

determining whether the data retention parameter corresponds to a soldering threshold; and in response to determining that the data retention parameter fails to correspond to the soldering threshold, performing the determining of whether the data retention parameter corresponds to an underfill threshold.

8. The system of claim 1, wherein the operations comprise:

in response to determining that the data retention parameter fails to correspond to an underfill threshold, determining whether logical saturation of the memory sub-system has been reached.

9. The system of claim 8, wherein the operations comprise:

in response to determining that the logical saturation of the memory sub-system has not been reached, monitoring for a power cycle event; and computing the data retention parameter in response to detecting the power cycle event.

10. The system of claim 8, wherein the operations comprise:

in response to determining that the logical saturation of the memory sub-system has been reached, allowing folding operations to enable the set of data to be stored in the first portion of memory components according to the second memory storage process.

11. The system of claim 1, wherein the operations comprise preventing folding operations to prevent the set of data from being stored according to the second memory storage process, the additional data being stored after the folding operations are prevented.

12. The system of claim 1, wherein the set of data comprises firmware of the memory sub-system.

13. The system of claim 1, wherein the second memory storage process comprises TLC memory storage, and wherein the operations comprise:

designating one or more blocks of the second portion of the set of memory components, in which the additional data is stored, with a special pattern of all seventh state.

14. The system of claim 1, wherein the second memory storage process comprises QLC memory storage, and wherein the operations comprise:

designating one or more blocks of the second portion of the set of memory components, in which the additional data is stored, with a special pattern of all fifteenth state.

15. A computerized method comprising:

storing a set of data in a first portion of a set of memory components according to a first memory storage process;

determining whether a data retention parameter of additional data stored in a second portion of the set of memory components corresponds to a first physical manufacturing process or a second physical manufacturing process; and performing an operation in association with at least one of the additional data or the set of data in response to refreshing the additional data stored in the second portion of the set of memory components and in response to determining whether the data retention parameter of additional data stored in the second portion of the set of memory components corresponds to the first physical manufacturing process or the second physical manufacturing process.

16. The computerized method of claim 15, wherein the first physical manufacturing process comprises soldering the first and second portions of the set of memory components, and wherein the second physical manufacturing process comprises applying underfill to the first and second portions of the set of memory components that have been soldered.

17. The computerized method of claim 15, comprising:

determining that the data retention parameter transgresses a soldering threshold that is greater than an underfill threshold; and in response to determining that the data retention parameter transgresses the soldering threshold that is greater than the underfill threshold, determining that the data retention parameter corresponds to the first physical manufacturing process.

18. The computerized method of claim 17, comprising:

after determining that the data retention parameter corresponds to the first physical manufacturing process, determining that the data retention parameter transgresses the underfill threshold and fails to transgress the soldering threshold; and in response to determining that the data retention parameter transgresses the underfill threshold and fails to transgress the soldering threshold, determining that the data retention parameter corresponds to the second physical manufacturing process.

19. The computerized method of claim 15, comprising:

determining whether the data retention parameter corresponds to a soldering threshold; and in response to determining that the data retention parameter corresponds to the soldering threshold, refreshing the additional data in the second portion of the set of memory components.

20. A non-transitory computer-readable storage medium comprising instructions that, when executed by a processing device, cause the processing device to perform operations comprising:

storing a set of data in a first portion of a set of memory components according to a first memory storage process;

determining whether a data retention parameter of additional data stored in a second portion of the set of memory components corresponds to a first physical manufacturing process or a second physical manufacturing process; and performing an operation in association with at least one of the additional data or the set of data in response to refreshing the additional data stored in the second portion of the set of memory components and in response to determining whether the data retention parameter of additional data stored in the second portion of the set of memory components corresponds to the first physical manufacturing process or the second physical manufacturing process.

* * * * *